UNITED STATES PATENT OFFICE.

ALFONS GAMS AND OTTO KAISER, OF BASEL, SWITZERLAND, ASSIGNORS TO SOCIETE OF CHEMICAL INDUSTRY IN BASLE, OF BASEL, SWITZERLAND.

ARALKYL ESTER OF 2-PHENYLQUINOLIN-4-CARBOXYLIC ACID.

1,378,343.  Specification of Letters Patent.  Patented May 17, 1921.

No Drawing.  Application filed June 23, 1920. Serial No. 391,166.

*To all whom it may concern:*

Be it known that we, ALFONS GAMS and OTTO KAISER, both citizens of the Swiss Republic, and residents of Basel, Switzerland, have invented a new and useful Aralkylester of 2-Phenylquinolin-4-Carboxylic Acid, of which the following is a full, clear, and exact specification.

It is known, that by the action of alkylhaloids on the salts of 2-phenyl-quinolin-4-carboxylic acid there are obtained alkylesters of this acid. In the same manner arylesters of the said acid have already been prepared, which have over the free acid the advantage of being tasteless.

We have now found that by substituting in these esters for the alkyl or the aryl group a benzyl radical, that is to say an aralkyl group, the ester shows always the same advantage. But by this substitution there results the further, therapeutically valuable advantage that the benzylester of 2-phenylquinolin-4-carboxylic acid is a much better solvent of uric acid than the alkyl or the arylesters of the said acid.

For the preparation of the new ester all the known methods for esterifying an acid can be employed. For instance, a salt of the 2-phenylquinolin-4-carboxylic acid can be decomposed by a halogenid of a benzyl alcohol in a convenient solvent, or dry gaseous hydrochloric acid can be introduced into a solution of 2-phenylquinolin-4-carboxylic acid in a benzyl alcohol, or the said solution can be heated with a little concentrated sulfuric acid, or a haloid of 2-phenylquinolin-4-carboxylic acid can be decomposed by a benzyl alcohol.

The invention is illustrated by the following examples.

*Example 1.*

2.5 parts of pulverized sodium 2-phenylquinolin-4-carboxylate are suspended in 10 parts of acetone and heated to ebullition on a water-bath in a vessel provided with a reflux condenser. 1.25 parts of benzylchlorid are added to the mass, drop by drop, while stirring. After about 20 to 24 hours the reaction is terminated, the acetone distilled off, the residue mixed with water, stirred with benzene, ether or another indifferent solvent and separated from the solution. The resulting solution, for instance the solution in benzene, is agitated several times with a dilute solution of sodium carbonate, washed with water until it becomes neutral and dried over calcium chlorid. By introducing dry gaseous hydrochloric acid in the solution in benzene there is obtained the hydrochlorate of the benzylester of 2-phenylquinolin-4-carboxylic acid in the form of a fine crystalline yellow powder. This salt is dissolved in alcohol, decomposed by adding solid sodium carbonate and separated by filtration from the deposed sodium chlorid. By concentrating the solution the ester crystallizes out. By recrystallization from alcohol or ether the said ester is obtained in a pure state. It melts at 77 to 78° C. It constitutes citron-yellow crystals insoluble in water, moderately soluble in ether and readily soluble in benzene and oils.

*Example 2.*

2.5 parts of chlorid of 2-phenylquinolin-4-carboxylic acid, 1.2 parts of benzylalcohol and 10 parts of benzene or toluene are boiled on an oil bath for 16 to 20 hours in a vessel provided with a reflux condenser. After cooling, the mass of reaction is mixed with water and a dilute solution of sodium carbonate and thoroughly agitated. The separated layer of benzene is agitated again several times with a dilute solution of sodium carbonate, finally washed with water until it becomes neutral and dried over calcium chlorid.

By introducing dry gaseous hydrochloric acid in the solution in benzene the hydrochlorate of the ester precipitates in the form of a fine, crystalline yellow powder from which the ester can be obtained as in Example 1.

What we claim is:

As a new article of manufacture, the herein described benzylester of 2-phenylquinolin-4-carboxylic acid, which forms citron-yellow crystals melting at 77 to 78° C., insoluble in water, moderately soluble in ether and readily soluble in oils and benzene and is capable of being employed for therapeutical purposes and has the properties of being tasteless and of being a better solvent for the uric acid than the hitherto known alkylesters and arylesters of 2-phenylquinolin-4-carboxylic acid.

In witness whereof we have hereunto signed our names this 4th day of June, 1920, in the presence of two subscribing witnesses.

ALFONS GAMS.
OTTO KAISER.

Witnesses:
WILLIAM E. HOLLAND.
AMAND BRANN.